United States Patent [19]
DeKoning et al.

[11] Patent Number: 5,778,426
[45] Date of Patent: Jul. 7, 1998

[54] METHODS AND STRUCTURE TO MAINTAIN A TWO LEVEL CACHE IN A RAID CONTROLLER AND THEREBY SELECTING A PREFERRED POSTING METHOD

[75] Inventors: Rodney A. DeKoning; Donald R. Humlicek; Max L. Johnson; Curtis W. Rink, all of Wichita, Kans.

[73] Assignee: Symbios, Inc., Fort Collins, Colo.

[21] Appl. No.: 546,861

[22] Filed: Oct. 23, 1995

[51] Int. Cl.⁶ ..................................................... G06F 13/00
[52] U.S. Cl. ..................... 711/122; 711/114; 364/DIG. 1
[58] Field of Search ..................................... 395/449, 180, 395/182.04; 371/40.4

[56] References Cited

U.S. PATENT DOCUMENTS

| | | | |
|---|---|---|---|
| 4,797,814 | 1/1989 | Brenza | 395/403 |
| 5,124,987 | 6/1992 | Milligan et al. | 371/10.1 |
| 5,235,601 | 8/1993 | Stallmo et al. | 371/40.1 |
| 5,276,848 | 1/1994 | Gallagher et al. | 395/448 |
| 5,315,602 | 5/1994 | Noya et al. | 371/40.4 |
| 5,386,547 | 1/1995 | Jouppi | 364/243.45 |
| 5,388,108 | 2/1995 | DeMoss et al. | 371/51.1 |
| 5,398,253 | 3/1995 | Gordon | 371/40.4 |
| 5,408,644 | 4/1995 | Schneider et al. | 395/180 |
| 5,530,832 | 6/1996 | So et al. | 395/449 |

OTHER PUBLICATIONS

David A. Patterson, Garth Gibson and Randy H. Katz; A Case for Redundant Arrays of Inexpensive Disks (RAID); Dec. 1987; Report No. UCB/CSD 87/391.

*Primary Examiner*—Tod R. Swann
*Assistant Examiner*—David Langjahr
*Attorney, Agent, or Firm*—Daniel N. Fishman; Wayne P. Bailey

[57] ABSTRACT

Methods and associated data structures operable in a RAID subsystem to improve I/O performance. A two level cache data structure and associated methods are implemented with a RAID controller. The lower level cache comprises buffers holding recently utilized blocks of the disk devices. The upper level cache records which blocks are present in the lower level cache for each stripe in the RAID level 5 configuration. The upper level cache serves to reduce the overhead processing required of the RAID controller to determine which blocks are present in the lower level cache. Having more rapid access to this information by lowering the processing overhead enables the present invention to rapidly select between different write techniques to post data and error blocks from low level cache to the disk array. A RMW write technique is used to post data and error checking blocks to disk when insufficient information reside in the lower level cache. A faster Full Write technique (also referred to as Stripe Write) is used to post data and error checking blocks to disk when all required, related blocks are resident in the lower level cache. The Full Write technique reduces the total number of I/O operations required of the disk devices to post the update as compared to the RMW technique. The two level cache of the present invention enables a rapid selection between the RMW and Full Write techniques.

23 Claims, 7 Drawing Sheets

METHODS AND STRUCTURE TO MAINTAIN A TWO LEVEL CACHE IN A RAID CONTROLLER AND THEREBY SELECTING A PREFERRED POSTING METHOD

BACKGROUND OF THE INVENTION

1. Field of the Invention

The invention relates generally to the control methods operable within a disk array subsystem (RAID) and in particular to a method for reducing the number of I/O operations required to update a section of storage in the disk array.

2. Background of the Invention

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules which may be activated to replace a failed, previously active storage module). These subsystems are typically referred to as redundant arrays of inexpensive (or independent) disks (or more commonly by the acronym RAID). The 1987 publication by David A. Patterson, et al., from University of California at Berkeley entitled *A Case for Redundant Arrays of Inexpensive Disks (RAID)*, reviews the fundamental concepts of RAID technology.

There are five "levels" of standard geometries defined in the Patterson publication. The simplest array, a RAID level 1 system, comprises one or more disks for storing data and an equal number of additional "mirror" disks for storing copies of the information written to the data disks. The remaining RAID levels, identified as RAID level 2,3,4 and 5 systems, segment the data into portions for storage across several data disks. One of more additional disks are utilized to store error check or parity information. The present invention is directed to improvements in the operation of RAID level 4 and 5 systems.

A RAID level 4 disk array is comprised of N+1 disks where N disks are used to store data, and the additional disk is utilized to store error checking information. Data to be saved is divided into portions consisting of one or many blocks of data for storage among the disks. The corresponding error checking information, which is typically a parity check calculated by performing a bit-wise exclusive-OR (XOR) of corresponding portions of the data stored across the N data drives, is written to the dedicated error checking (parity) disk. The parity disk is used to reconstruct information in the event of a disk failure. Writes typically require access to two disks, i.e., one of the N data disks and the parity disk, as will be discussed in greater detail below. Read operations typically need only access a single one of the N data disks, unless the data to be read exceeds the block length stored on each disk.

RAID level 5 disk arrays are similar to RAID level 4 systems except that error checking information, in addition to the data, is distributed across the N+1 disks in each group. Each one of the N+1 disks within the array includes some blocks for storing data and some blocks for storing parity information. The location in the groups for storage of the error checking (parity) information is controlled by an algorithm implemented by the user. As in RAID level 4 systems, RAID level 5 writes typically require access to two disks; however, no longer does every write to the array require access to the same dedicated parity disk, as in RAID level 4 systems. This feature provides the opportunity to perform concurrent write operations in distinct groups since the parity (error checking information) is not centralized on one disk device.

RAID storage subsystems typically utilize a control module that shields the user or host system from the details of managing the redundant array. The controller makes the subsystem appear to the host computer as a single, highly reliable, high capacity disk drive. In fact, the RAID controller may distribute the host computer system supplied data across a plurality of the small independent drives with redundancy and error checking information so as to improve subsystem reliability.

The added redundancy and error checking information improves the reliability of the RAID subsystem but tends to negatively impact subsystem performance due to the added overhead required to create and manage the redundancy and error checking information. To maintain high levels of performance in view of the added overhead, most RAID subsystems rely on high speed cache memory (semiconductor memory devices) to maintain the required performance levels. Write operations to such cached RAID subsystems are typically performed by writing the updated information into the cache memory to permit the host system to continue with other operations. The cached memory is then processed as required to write (post) the cached information permanently to the disk devices. Despite the fact that the host system is allowed to continue operations in parallel with the eventual posting of the write operation to the disk array, the RAID subsystem performance in posting the data to the disk array remains a problem in high performance applications where, for example, the host computer (or another host computer) rapidly generates a plurality of write operations.

Posting the cached data to the disk devices is typically done by a read-modify-write (RMW) method wherein the new data blocks to be posted are used in conjunction with related old blocks on the disk devices to compute the new error checking information associated with the new data blocks. The related old blocks are read from the disk devices in order to compute the new error checking information. These additional block reads severely limit the performance of the RAID subsystem. Some prior designs avoid these additional reads by inspecting cache memory to determine whether the required old blocks are already present and usable in the cache. Although this inspection and analysis is faster than the additional reads from the disk devices, in a RAID subsystem with a large cache memory this operation can consume significant processing time searching the lists of cached disk blocks thereby reducing overall RAID subsystem performance.

In view of the above it is clear that a need exists for an improved cache architecture and control method for RAID subsystems which further reduces the overhead processing required of the RAID subsystem to post cached writes to the disk devices.

SUMMARY OF THE INVENTION

The present invention solves the above and other problems, and thereby advances the useful arts, by providing methods and associated apparatus which permit further improvements of RAID subsystem performance. Specifically, the present invention provides for a two level cached structure and associated methods which improve the performance of RAID subsystems in identifying blocks resident in cache which require posting to the disk devices due to a write operation (so called dirty blocks). Further, the present invention includes methods which utilize the information in the upper level cache structures to rapidly select between traditional RMW posting methods and the potential performance improvements attainable by writing all disk device blocks in a section (stripe) to be posted (thereby obviating the need for reading the related old blocks).

In the two level cache of the present invention, the lower level cache is operated in a manner analogous to those of prior designs to maintain buffers which correspond to recently read or written disk device blocks (both data and error checking blocks). The higher level cache of the present invention is used to maintain data structures which describe the contents of the lower level cache as they correspond to stripes in the disk array (sections of the disk array as defined by the RAID level 5 standards).

The upper level cache is used by methods of the present invention to determine which of two writing methods is optimum to post a particular write operation to the disk devices. Information comprising modified data blocks and associated error checking blocks may be posted to the disk devices by either of two writing methods. First, the RMW method, discussed above, uses the new data blocks to be written to disk along with the corresponding old data blocks and associated error checking blocks to compute the values for new error checking blocks. The new data blocks and the associated new error checking blocks are then written to the disk devices to thereby post the new data blocks to the disk devices. A second method, called the Full Write method (also referred to herein as a Stripe Write method), writes new data block and associated new error checking blocks without reading the old data or associated old error checking blocks from the disk devices. Rather, other data blocks and error checking blocks found to be resident in the lower level cache are used in conjunction with the new data blocks to compute new error checking blocks to be written without reading the old error checking blocks. The first method, the RMW method, functions properly regardless of the other information resident in the lower level cache, but requires read operations to read the old data and associated old error checking blocks corresponding to the new data blocks. The second method, the Full Write method, uses other related blocks already resident in the lower level cache to compute the new error checking block associated with the new data blocks. This Full Write method obviates the need for reading the old data blocks and the old error checking blocks, thereby improving performance of the RAID subsystem. However, this method requires knowledge of the blocks resident in the lower level cache. The upper level cache structures and methods of the present invention enable the use of the Full Write method without incurring the processing overhead of prior designs.

The upper level cache is used to maintain information regarding the blocks present in the lower level cache. If sufficient, relevant, related blocks are found to be resident in the lower level cache by inspection of the structures of the upper level cache, then the methods of the present invention utilize the higher performance Full Write method instead of the RMW method to post the write operation from cache to the disk devices. The upper level cache maintains information regarding the contents of the lower level cache to improve the speed of determining whether the related blocks are present in the lower level cache. Rather than a simple, time consuming sequential search of the lower level cache, the methods of the present invention query the structures in the upper level cache to determine the presence or absence of the related blocks in the lower level cache required to perform the Full Write method. This aspect of the present invention improves the performance of the RAID subsystem by dramatically reducing the processing time required to determine whether a Full Write method may be applied.

It is therefore an object of the present invention to improve the I/O performance of a RAID subsystem.

It is a further object of the present invention to provide data structures used within a RAID controller which improve the I/O performance of the RAID subsystem.

It is a further object of the present invention to provide methods used within a RAID controller which improve the I/O performance of the RAID subsystem.

It is still a further object of the present invention to provide a two level cache structure used within a RAID controller which improve the I/O performance of the RAID subsystem.

It is a further object of the present invention to provide methods which utilize a two level cache structure within a RAID controller which improve the I/O performance of the RAID subsystem.

It is yet another object of the present invention to provide methods and apparatus to maintain an upper level cache memory structure in a RAID controller for purposes of recording the contents of a lower level block cache in the RAID controller.

It is yet another object of the present invention to provide methods which utilize the two level cache structure within a RAID controller to rapidly select an optimal method for posting modified buffers from the lower level cache to the disk devices.

It is still another object of the present invention to provide methods which rapidly selects between an RMW posting method and a Full Write posting method for posting modified buffers from the lower level cache to the disk devices.

The above and other objects, aspects, features, and advantages of the present invention will become apparent from the following description and the attached drawing.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
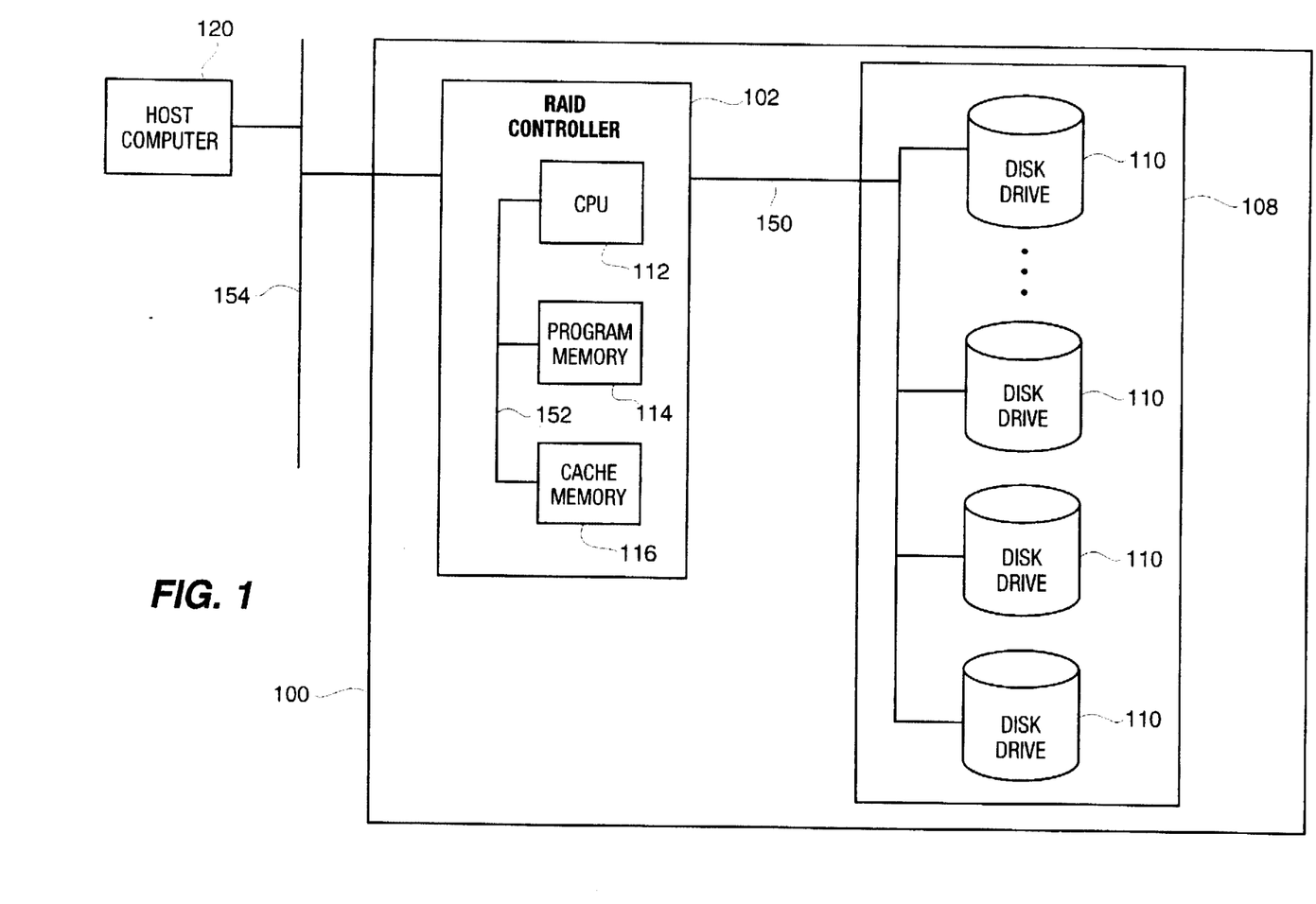
FIG. 1 is a block diagram of a typical RAID storage subsystem in which the structures and methods of the present invention may be applied.

Raid Overview:

FIG. 1 is a block diagram of a typical RAID storage subsystem 100 in which the methods and associated apparatus of the present invention may be applied. RAID storage subsystem 100 includes RAID controller 102 which is in turn connected to disk array 108 via bus (or busses) 150 and to host computer 120 via bus 154. Disk array 108 is comprised of a plurality of disk drives 110. One of ordinary skill in the art will readily recognize that interface bus 150 between RAID controller 102 and disk array 108 (including disk drives 110) may be any of several industry standard interface busses including SCSI, IDE, EIDE, IPI, Fiber Channel, SSA, PCI, etc. Circuits (not shown) within RAID controller 102 appropriate to controlling bus 150 are well known to those of ordinary skill in the art. Interface bus 154 between RAID controller 102 and host computer 120 may be any of several standard industry interface busses including SCSI, Ethernet (LAN), Token Ring (LAN), etc. Circuits (not shown) within RAID controller 102 appropriate to controlling bus 154 are well known to those of ordinary skill in the art.

As shown in FIG. 1, RAID storage subsystem 100 may be applied to implement any of the well known RAID levels (e.g. levels 1–5). The various RAID levels are distinguished by the manner in which RAID controller 102 logically subdivides or partitions the disk drives 110 in disk array 108. For example, when implementing RAID level 1 features, approximately half of the disk drives 110 of disk array 108 are used to store and retrieve data while the other half is operated by RAID controller 102 to mirror the data storage contents of the first half. Further, when implementing RAID level 4 features, RAID controller 102 utilizes a portion of the disk drives 110 in disk array 108 for the storage of data and the remaining disk drives 110 are utilized for the storage of error checking/correcting information (e.g. parity information). As discussed below, the methods and associated apparatus of the present invention may be applied to the RAID storage subsystem 100 in conjunction with any of the standard RAID levels. However, the present invention is mostly readily applicable to operation of a RAID storage subsystem 100 implementing the features of RAID levels 2–5.

RAID controller 102 includes CPU 112, program memory 114 (e.g. ROM/RAM devices for storing program instructions and variables for the operation of CPU 112), and cache memory 116 for storing data and control information related to the data stored in disk array 108. CPU 112, program memory 114, and cache memory 116 are connected via memory bus 152 to enable CPU 112 to store and retrieve information in the memory devices. The data structures of the present invention are embodied within cache memory 116 and are created and manipulated by methods operable with CPU 112. One of ordinary skill in the art will readily recognize that the block diagram of FIG. 1 is intended only as an exemplary design which may embody the present invention. Many alternate controller and subsystem designs may embody the methods and associated apparatus and structures of the present invention.

Figure 2:
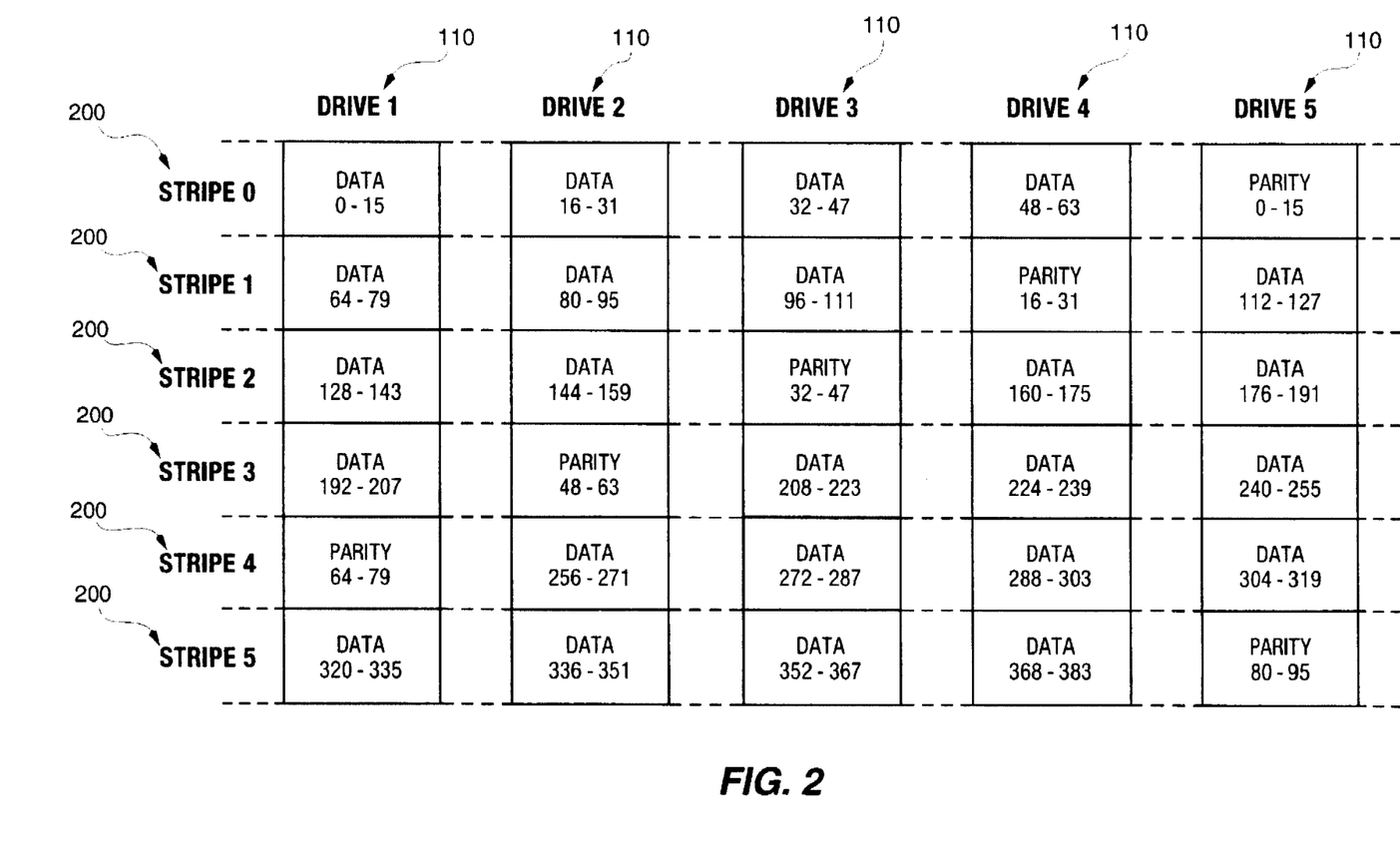
FIG. 2 depicts an exemplary mapping of logical blocks of a disk array to stripes as defined under the RAID level 5 specifications.

Although the present invention may be applied to several of the standard RAID levels, FIG. 2 as well as subsequent figures and descriptions are oriented toward RAID level 5 features. One of ordinary skill in the art will readily recognize that the features, methods, and apparatus of the present invention may be similarly applied to other RAID level implementations. For example, RAID level 5 standards partition the disk drives 110 of disk array 108 (of FIG. 1) to distribute the data and error checking information across all the active disk drives 110 of the disk array 108 ("active" disk drives are those presently in use to store data or error checking information as distinct from "spare" disk drives used only to recover from a failure and otherwise generally idle). Each partition is commonly referred to as a stripe. Each of several stripes in the RAID level 5 storage subsystem contains data and associated error checking information distributed across all of the active disk drives 110 in the disk array 108. It is common in RAID level 5 to utilize simple parity information for error checking information. Therefore, the parity information for each stripe usually is placed on one disk drive 110 while the data is stored on the remaining disk drives 110. As defined by the RAID level 5 standards, the disk drive 110 used for parity information varies in the stripes so that multiple stripes may be manipulated in parallel in response to host computer generated requests.

FIG. 2 depicts a simple, exemplary distribution of data and parity information into six stripes 200 on five disk drives 110 of a disk array. Disk drives 110 are individually labeled Drive 1 through Drive 5 and the data stored in each drive is indicated as a column of rectangles below each label. Stripes 200 are individually labeled Stripe 0 through Stripe 5 and the data and parity information associated with each stripes is represented by the horizontally aligned rectangles of each disk drive 110. Each rectangle in the two dimensional array of FIG. 2 represents a grouping of blocks corresponding to one disk drive in one stripe. This grouping is often referred to as a segment (or chunk or cluster). A RAID storage subsystem controls a plurality of disk drives so as to appear to an attached host computer to be a single, large contiguous block storage device (i.e. a large single disk drive) having logical blocks numbered from zero through the number of blocks in the subsystem (minus the number of blocks reserved for parity information). In the case of the RAID level 5 standard, the RAID subsystem the contiguous block numbers which comprise each stripe are indicated by the block numbers in each rectangle of each disk in the stripe. For example, the stripe 200 individually labeled Stripe 0 comprises a segment of logical blocks 0–15 residing on Drive 1, a segment of logical blocks 16–31 residing on Drive 2, a segment of logical blocks 32–47 residing on Drive 3, a segment of logical blocks 48–63 residing on drive 4, and a segment of parity logical blocks 0–15 residing on Drive 5.

FIG. 2 further depicts the variable placement of the parity information with the several stripes 200. For example, the parity blocks associated with the data in Stripe 0 reside on Disk 5 with the data blocks stored on Drives 0–4. In Stripe 1 however, the parity blocks are stored on Drive 4 while the data blocks reside on Drives 1–3 and Drive 5. As is well known to those of ordinary skill in the art, this logical mapping of blocks to stripes and of stripes to disk drives improves performance by permitting multiple parallel operations to be performed on multiple stripes. Details of the operation model and logical mapping of the several RAID levels are well known to those of ordinary skill in the art and are thoroughly discussed in the Patterson publication (id.) and other well known publications.

Definitions:

To simplify the following discussions, terminology common to the RAID level 5 standard will be used to represent all types of RAID subsystems (in particular RAID level 2–5 subsystems). For example, as used herein, parity disk means the disk drive or drives used in the RAID subsystem to store parity information. Parity information or error checking information as used herein, means any error checking/correcting information stored on the parity disks. Simple parity codes are typical in many RAID subsystems, but more complex error checking or correcting codes may be used as well. Parity information or error checking information as used herein means any such error checking or correcting codes.

Additionally, stripes as used herein, means any partitioning of the disk drives in the RAID subsystem. Some RAID level models may refer to such partitions by names other than stripes. Therefore, as used herein, the term stripes means any such partitioning of the disk array, including but not limited to stripes as defined in the RAID level 5 standard.

A RAID storage subsystem (or simply RAID subsystem) refers to the entire mass storage subsystem including a RAID controller 102 and the attached disk array 108. A RAID controller as used herein refers to the control electronics and software which interfaces the disk array 108 to the host computer system(s) 120 including the mapping of host provided block numbers/addresses into specific physical blocks or addresses in the disk drives 110 of the disk array 108. In addition the RAID controller as used herein incorporates the redundancy management to create and parity information in the storage of the disk array 108.

Blocks as used herein means the typical unit or quantum of transfer between the RAID controller 102 of FIG. 1 and the disk drives 110 of the disk array 108. In some implementations the block may correspond one-for-one with blocks addressable within the individual disk drives 110. In other implementations, the RAID controller 102 may map logical block numbers to cylinder/head/sector addresses in the disk drives 110. In any case the RAID controller maps the logical block numbers used to interact with the host computer system(s) 120 into the physical addresses required for the specific disk drives 110 used in the disk array 108. In addition, a logical block may map to one or more physical blocks or sectors. A block as used herein may therefore refer to a cluster of blocks or sectors aggregated and managed as a larger unit of transfer.

As used herein, a dirty block is one which resides in the cache memory reflective of modifications requested by a write operation from a host computer system. The dirty block resides in the cache memory 116, retaining the dirty attribute, until a posting process writes the dirty block to the disk array 108. Once so posted, the dirty block is effectively "cleansed" and may reside in cache memory as a normal block (a non-dirty block).

The process of writing information from dirty blocks found in the cache memory 116 to the disk array 108 is also referred to herein as a posting method. The data and parity information is said to be written to, or posted to, the disk array by this process.

The cache memory in which the cache structures used by the present invention is referred to by several terms. The lower level cache in which disk blocks are stored (also referred to as the first level cache) is stored in the cache memory. Additionally the data structures which are used to approximate the content of the lower level cache is stored in the cache memory and is referred to as both the upper level cache or the second level cache.

First Level Cache:

It is well known to provide cache memory within a storage controller to improve performance of the storage device/subsystem. Recently read blocks of information are stored in a cache memory so that subsequent requests may retrieve the same data directly from the cache memory rather than requiring repeated access to the slower mass storage device (e.g. disk drives). Further, RAID controller processing of a write request for particular logical blocks causes the associated write data to be stored in the cache memory. Once stored in memory, the host computer may be informed that the operation is completed thereby freeing the host computer system to continue with other operation. Asynchronous from the host write request, the storage subsystem may later post (write) the cached write data onto the mass storage devices (disk drives). These caching techniques, well known to those of ordinary skill in the art, are referred to herein as first level caching and the cache memory associated therewith is referred to herein as a first level cache memory (or simply first level cache).

Prior Posting Methods—Problems:

As noted above, it is known in the art to asynchronously post the write data cached in the first level cache (also referred to herein as modified blocks or dirty blocks). In prior designs, it was common to sequentially search the blocks stored in the first level cache to identify those blocks in the cache that are dirty or modified. Dirty blocks so located would then be written to the disk array to maintain integrity of the data on the disk drives. The sequential search of the first level cache, even though asynchronous with respect to the host computer systems, reduces the overall performance of the RAID subsystem. In large RAID subsystems, with large cache memory devices, this sequential search technique could require substantial processing time.

In addition, when write data is posted to (written to) a stripe of the disk array it is necessary to update the parity information on the parity disk of the stripe. Updating the parity information requires reading the old parity information stored on the parity disk as well as reading related data blocks on the disk array (the old data stored on the disk array stripe corresponding to the dirty blocks modified by the write request). These blocks must be read in order to compute the new parity information. This method of updating the disk array is commonly referred to as a Read-Modify-Write method reflecting the need to read a number of blocks from the disk array, modify blocks to reflect the write data in dirty blocks of the first level cache (including updated parity information), and writing the updated information (data and parity) back to the disk array. If sufficient blocks of a stripe are known to be present in the first level cache, then another posting method may be preferred to lessen the number of read operations. The so called Full Write method (also commonly referred to as a Stripe Write method) reads all data blocks from the stripe on the disk which are not dirty (all data blocks in the stripe not modified by the write request), computes new parity information over the blocks of the stripe in the first level cache (the newly read unmodified blocks as well as the dirty blocks), and then writes the modified blocks along with the updated parity information. Since the parity information is recomputed from all data of the stripe as stored in the first level cache, the old parity information on the parity disk of the stripe need not be read. This Full Write method (Stripe Write method) may reduce the number of read operation required of the posting process. However, as above, it must first be determined how many blocks need be read for each posting method to determine which posting method is preferred for the posting of a particular stripe on the disk array. Such a determination, as above, has typically been performed by a time consuming sequential scan of the blocks found in the first level cache.

Second Level Cache:

The present invention includes a second level cache data structure, stored in cache memory 116 of FIG. 1, which provides control information describing the data in the first level cache. This control information is created, managed, and utilized by associated methods of the present invention. The second level cache data structure (also referred to herein as second level cache) is stored in cache memory 116 of FIG. 2 (also referred to herein as second level cache memory). One of ordinary skill in the art will readily recognize that the first and second level cache data structures may be stored in a common memory (e.g. cache memory 116) or in separate memory devices within the intended scope of the present invention.

The second level cache includes a stripe management data structure corresponding to each stripe in the RAID storage subsystem. For each stripe in the disk array, a stripe management data structure, stored in the second level cache memory, contains information which serves to identify (at least to an approximation) the dirty blocks in the first level cache which correspond to the stripe corresponding to the stripe management structure. Each time a write request is processed, the stripe management data structure for any affected stripe is updated by methods of the present invention to reflect any additional dirty blocks created by the write request in the corresponding stripe. Other methods of the present invention utilize the information contained in the second level cache (in the stripe management data structures) to rapidly determine which dirty blocks must be posted and which posting method to select for optimum performance of the posting process. These methods are discussed in detail below.

The stripe management structures (the second level cache) may be understood by the following exemplary C language data structure:

```
struct stripe_mgt {
    boolean  contiguous;  /* indicates contiguity of the stripe's dirty
                             blocks */
    int      start;       /* start block number of range of dirty blocks */
    int      end;         /* end block number of range of dirty blocks */
    int      count;       /* approximate number of dirty blocks in range */
}
```

Figure 3:
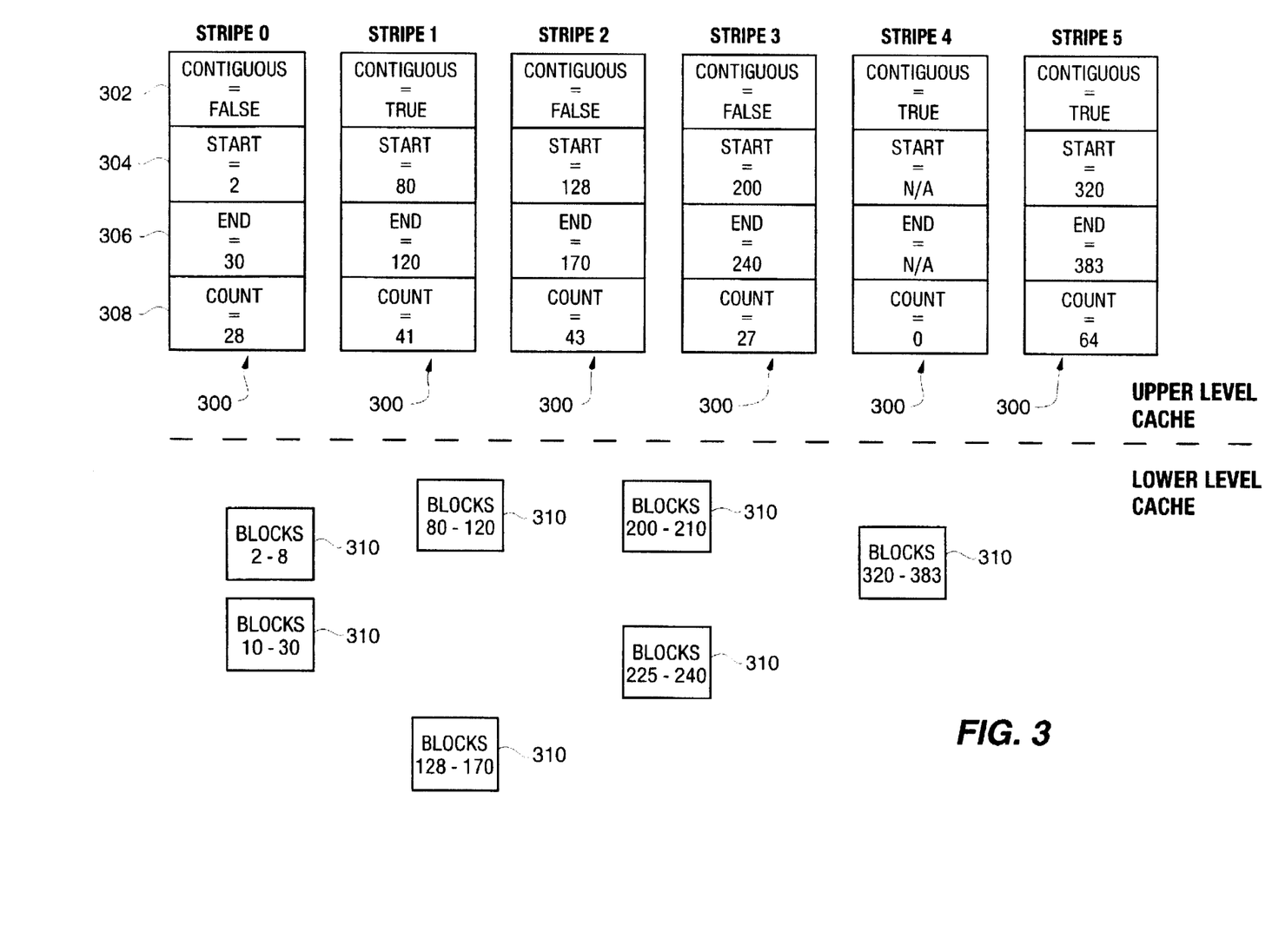
FIG. 3 depicts an exemplary state of the upper level cache (second level cache) and lower level cache (first level cache) as they might represent the state of the RAID subsystem shown in FIG. 2.

FIG. 3 shows a block diagram exemplifying the first and second level caches as they might represent the state of the exemplary disk array shown in FIG. 2. Rectangles below the dashed line represent groups of disk blocks stored in buffers of the first level cache memory (also referred to as the lower level cache). The cached disk blocks 310 are labeled to indicate the logical block numbers of dirty blocks present in the lower level cache. For example, as shown in FIG. 3, blocks 2-8 and 10-30 of Stripe 0 are present in the lower level cache. Also, blocks 80-120 of Stripe 1, blocks 128-170 of Stripe 2, blocks 200-210 and 225-240 of Stripe 3, no blocks from Stripe 4, and blocks 320-383 of Stripe 5 are present in the lower level cache (first level cache).

Rectangles above the dashed line represent stripe management data structures 300 resident in the second level cache memory (also referred to as the upper level cache). Each stripe management structure 300 is associated with one of the stripes 200 (as shown in FIG. 2). The associated stripe 200 is shown as a label above each stripe management data structure 300 (hereinafter referred to as SMS). The SMS 300 associated with Stripe 0 indicates by its contiguous variable that the dirty blocks in the lower level cache associated with Stripe 0 are not contiguous. As noted above, there are two non-continuous groups of dirty blocks in the lower level cache for Stripe 0, namely blocks 2-8 and 10-30. The first variable of the SMS 300 for Stripe 0 is therefore set to 2 and the end variable is therefore set to 30 indicative of the lowest and highest logical block numbers in the range of dirty blocks associated with Stripe 0. The count variable of the SMS 300 for Stripe 0 is therefore set to 28. As will be discussed below, for simplicity, the methods of the present invention make no attempt to precisely track the number of dirty blocks in the lower level cache, but rather attempt to approximately model the contents of the lower level cache for each corresponding stripe.

In a similar manner, the variables of the SMS 300 for Stripe 1 indicate a contiguous group of 41 blocks starting at block 80 through block 41. The variables for the SMS 300 for Stripe 4 indicate that no dirty blocks are known to be present in the lower level cache related to Stripe 4. Similarly, the SMS 300 for Stripe 2, Stripe 3, and Stripe 5 all have variable settings reflective of their respective stripe's approximate state with respect to dirty blocks stored in the lower level cache.

SMS Update Method:

A method of the present invention operable within the RAID controller (102 of FIG. 1) creates and maintains the second level cache (SMS 300 associated with each stripe). On completion of each write operation (e.g. storing the new dirty blocks from a host computer write request in the first level cache), a method of the present invention is invoked to update the SMS 300 in the second level cache. The method (function) is invoked for each stripe affected by the host computer's write request with parameters indicating the first logical block number of a newly "dirtied" block and the number of contiguous dirty blocks which follow the first within the same stripe. The function then determines which SMS 300 is to be updated and modifies the variable in the SMS to reflect the new state of the lower level cache with respect to the corresponding stripe.

Figure 4:
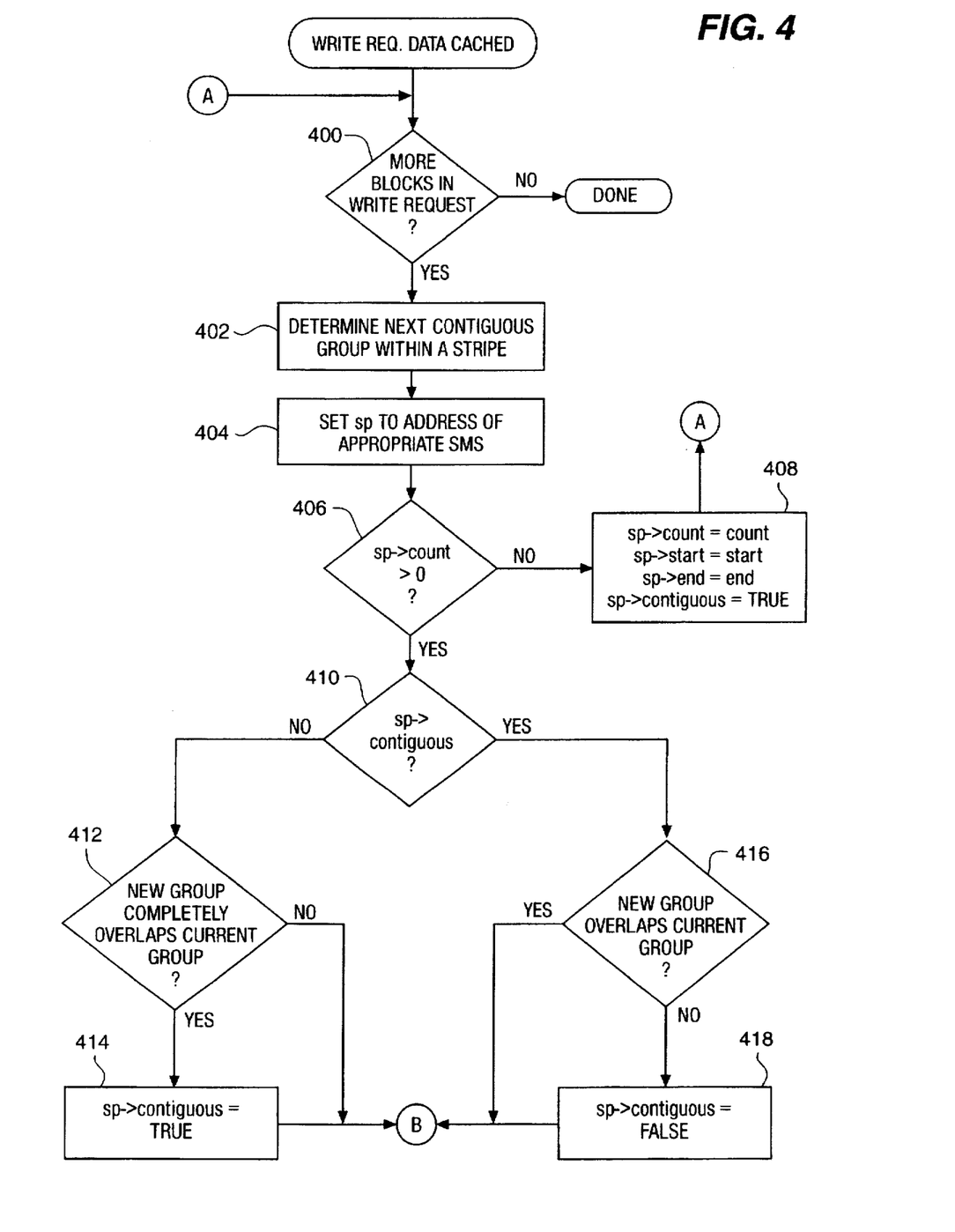
FIGS. 4 and 5 together are a flowchart of the method of the present invention which updates the second level cache (upper level cache) data structures as new blocks are "dirtied" by host computer write operations.
Figure 5:
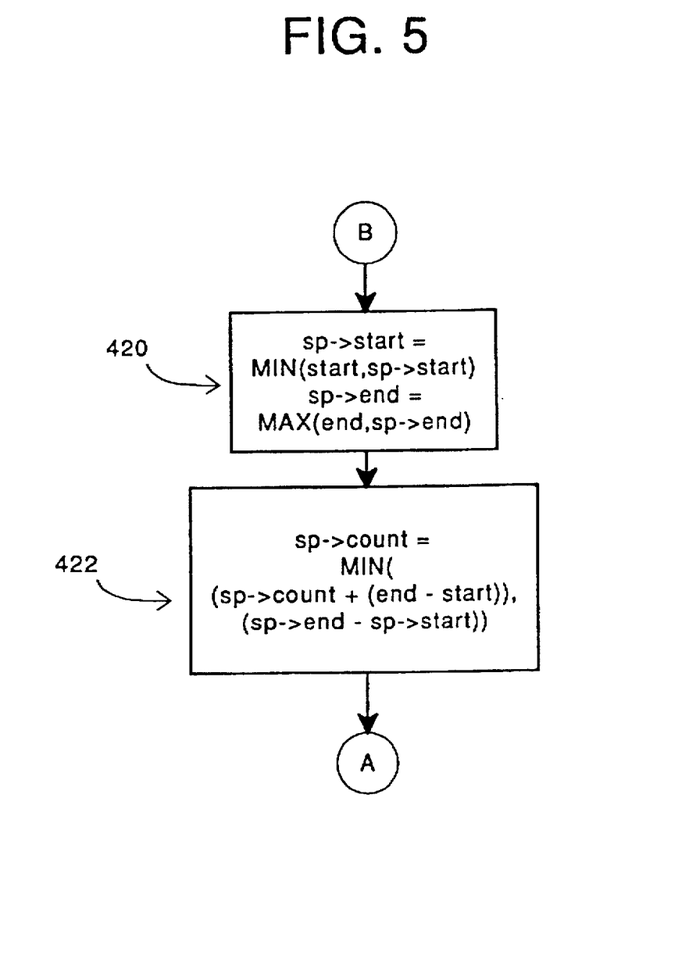

FIGS. 4 and 5 are a flow chart describing the operation of the SMS update method of the present invention. The method depicted in FIGS. 4 and 5 is invoked after the data from a host computer write request has been written to the first level cache (lower level cache). The method is invoked with a parameter indicating the first logical block number in the host computer write request and a parameter indicating the number of blocks in the write request. Element 400 is operable to determine whether all the blocks in the host computer write request have been processed by operation of elements 402-422. If processing of all blocks has completed (no further blocks to be processed), then processing of the SMS update method is completed. At some later time, asynchronous with respect to the SMS update method or the host computer write request processing, a selected posting method will post the newly "dirtied" buffers in the first level cache to the disk array. If more blocks remain to be processed as determined by operation of element 400, then processing continues with element 402.

Elements 402 is next operable to initialize for processing the next contiguous group of blocks in the host computer write request which are contained within a single common stripe. Element 404 is then operable to initialize a data structure pointer variable sp to point to the appropriate stripe management structure 300 in the second level cache (upper level cache) of FIG. 3. Element 402 and 404 combine to identify the groups of contiguous blocks and selects the stripe management structure with which they are associated.

Element 406 and 408 operate in combination to initialize a stripe management structure which currently reflects a status of no dirty blocks stored in the first level cache. If element 406 determines that the SMS indicates no dirty blocks presently stored in the first level cache (e.g. the count variable of the structure equals zero), then processing continues with element 408. Element 408 initializes the selected SMS to indicate a contiguous group of dirty blocks starting at the start block provided and ending at the last block provided in the present group of block being processed (as identified by element 402 above). After initializing the new SMS values, processing continues by looping back to element 402.

If element 406 determines that the SMS indicates dirty blocks are already present in the first level cache, then processing continues with element 410. Elements 410–418 are operable to determine whether the combination of the new group of dirty blocks and the presently known group of dirty blocks in the SMS are continuous or non-contiguous. Element 410 determines whether the presently known group of dirty blocks in the first level cache are contiguous by inspecting the SMS continuous flag variable. If the presently known dirty blocks are not contiguous, then elements 412 and 414 combine to determine whether the newly dirtied blocks overlap the presently known ones dirty blocks completely so as to make the new group of known blocks in the SMS again contiguous. If the new group of dirty blocks completely encompasses the presently known group, then the SMS contiguous flag is set, otherwise if remains reset—indicative of continued non-contiguity. Conversely, if element 410 determines that the present known group of dirty blocks are contiguous, then elements 416 and 418 determine whether the newly dirtied blocks fail to overlap so as to make the new group non-contiguous. If the newly dirtied group of blocks does not overlap the presently known group of dirty blocks, then the SMS contiguous flag variable is reset to indicate non-contiguity, otherwise the flag is left set—indicative of continued contiguity. In all cases, processing continues with element 420 and 422 on FIG. 5.

Element 420 of FIG. 5 is operable to set the new start of the group of known dirty blocks to the minimum of the presently known start block number and the newly dirtied start block number. Similarly, the new end of the group is set to the maximum of the presently known end and the newly dirtied end block number. This effectively merges the two groups into one larger group (whether contiguous or not). Element 422 is then operable to set the count variable to the minimum value of the old count incremented by the count of the newly known group of dirtied blocks or the value determined by computing the count in blocks of the new merged group. SMS update method processing for the present group of newly dirtied blocks is then completed and processing continues with additional groups by looping back to element 402.

The SMS update method described above with respect to FIGS. 4 and 5 attempts only to approximate the number of dirty blocks stored in the first level cache associated with a particular stripe. Specifically, elements 420 and 422 only estimate the number of blocks by ignoring discontinuities in the merged block. As used in conjunction with the posting selection method discussed below, this estimated information is sufficient to select between the posting methods. Absolute assurance that the count is correct adds complexity to the stripe management data structures and the SMS update method. The added complexity is not offset by the possible improvements in the methods below for selecting between different posting methods. Periodically selecting the less optimal posting method due to errors in the approximations of the SMS update method will not severely impact the performance of the RAID subsystem. However, adding complexity to the SMS update processing, performed on every host computer initiated write request, could negatively impact the performance. In either case, one of ordinary skill in the art will readily recognize many variations in the SMS update methods the data structures within the scope and spirit of the present invention.

Figure 6:
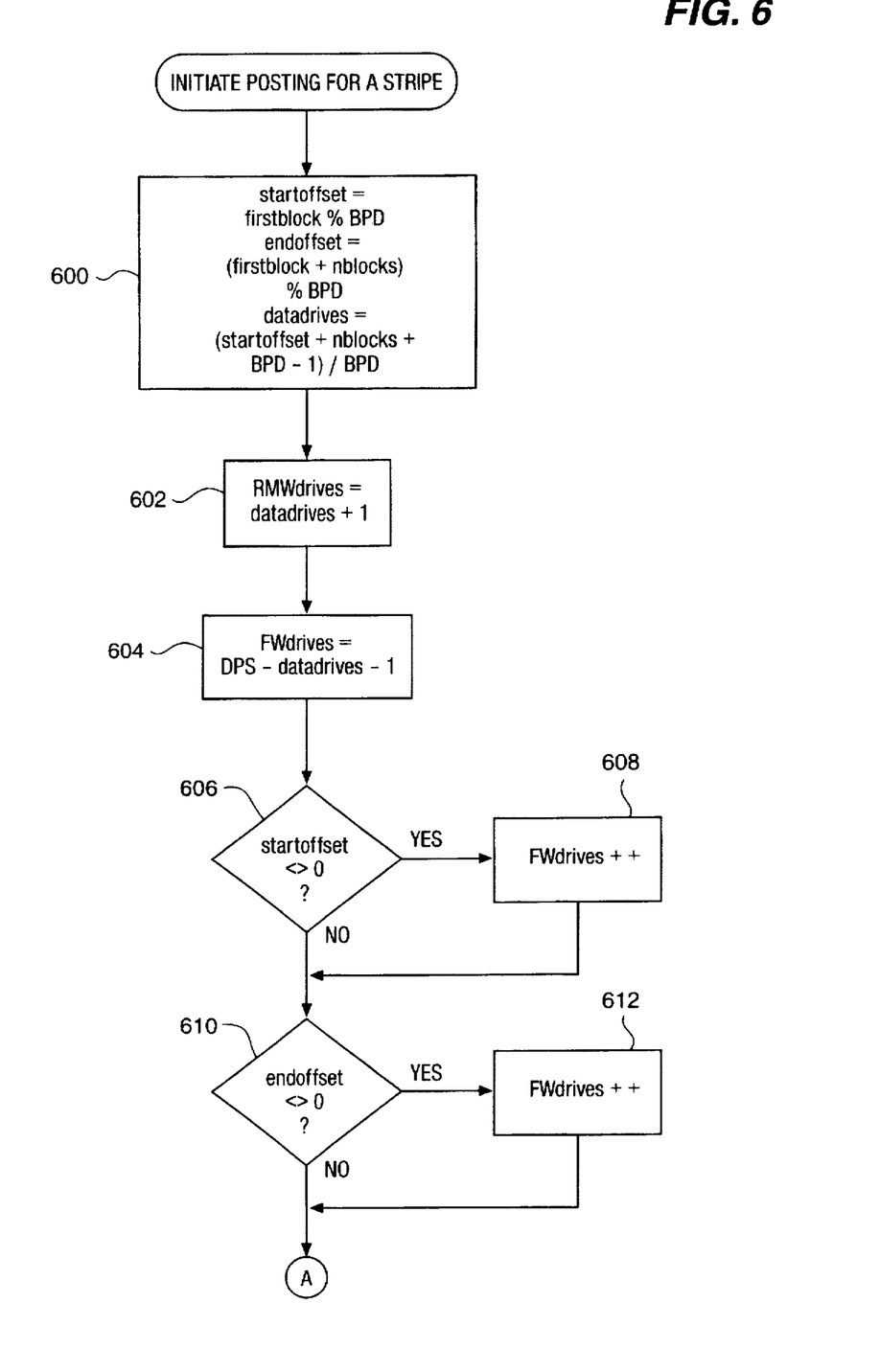
FIGS. 6 and 7 together are a flowchart of the method of the present invention which selects a preferred one of two posting methods based upon information in data structures of the second level cache.
Figure 7:
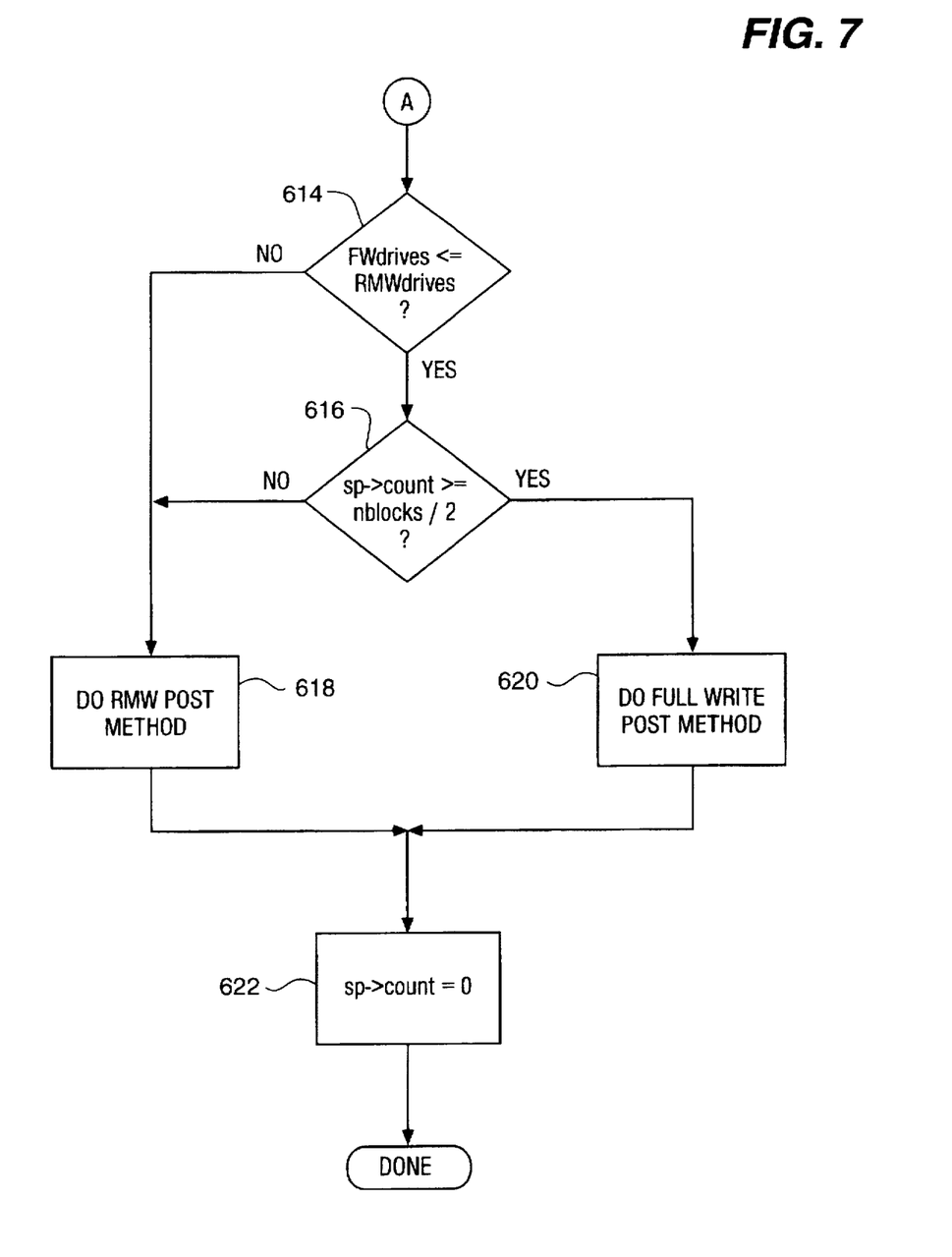

Posting Selection Method:

FIGS. 6 and 7 are a flowchart of the method of the present invention which utilizes the stripe management structures stored in the second level (upper level) cache to select a preferred method for posting the dirty blocks of a stripe to the disk array. As discussed above, two methods are commonly utilized in RAID subsystems to post dirty blocks: the so called RMW or Read-Modify-Write method and the so called Full Write or Stripe Write method. The RMW posting method reads the old blocks from the disk array which correspond to the new (dirty) blocks to be posted. In addition, the RMW method reads the old parity information from the disk drives. The old data and parity is used in conjunction with the new (dirty) data to determine new parity information. The new (dirty) data and the newly computed parity information is then written back to the drive array. The Full Write or Stripe Write method, by contrast, reads any old blocks from the disk array which are not included in the set of dirty blocks associated with the stripe to be posted. The old data blocks and the newly dirtied data blocks are then used to compute new parity information. The old parity information need not be read from the disk array. The complete set of blocks in the stripe along with the newly computed parity information is then written back to the disk drives.

Prior RAID subsystem controller always performed one or the other of these posting methods, or dynamically selected the preferred method based on a determination dependent upon a time consuming sequential scan of the blocks found in the first level cache. This time consuming sequential scan of the first level cache negatively impacts the overall performance of the RAID subsystem. The methods of the present invention use the stripe management structure information stored in the second level (upper level) cache to more rapidly select a preferred method. Since the information stored by the SMS update method (described above) is only an approximation of the actual contents in the first level cache for each stripe, this posting selection method applies heuristic selection criteria to select the preferred posting method based on an approximation of the number of read operations required of the disk array in order to compute updated parity in advance of physically writing the data to the disk array. These heuristic approximations determine a worst case approximation for the number of read operations required for each of the posting methods. The posting method which would likely (according to the approximations) require fewer read operations is selected. This method of the present invention improves upon the prior designs by rapidly approximating the performance of both the RMW and FW posting methods and selecting the preferred method. Avoiding the time consuming sequential scan of the first level cache enables the performance improvements of the present invention in a RAID subsystem. The posting selection method of the present invention is not assured to always select the best method, but the heuristics usually select the preferred method and significantly reduce the overhead as compared to prior methods for selecting the preferred method.

The selection of the preferred posting method, as well as the actual invocation of the selected method, is initiated by other processing within the RAID subsystem which determines the preferred time to post dirty buffers. This processing is typically performed as a background process, asynchronously with respect to the host computer system and its write requests.

The posting selection method of the present invention is invoked as part of the posting process and is passed the firstblock (first dirty block number in the stripe) and nblocks (number of contiguous blocks to post) variables as its parameters.

Element 600 of FIG. 6 is first operable in the posting selection method to compute the starting and ending block number offset relative to the start of the segment in which they reside in the stripe being posted. The startoffset and endoffset values represent, respectively, the block number of the first and last blocks on their respective segments in the stripe to be posted. The values are computed using modulo arithmetic with the number of blocks per drive (BPD). For example, as shown in the disk array geometry of FIG. 2, there are 16 blocks per drive in each stripe, therefore, BPD is 16 in such an exemplary geometry. Lastly, element 600 computes the value of datadrives as the number of disk drives which store the group of dirty blocks in the stripe to be posted. This is the number of disk drives which contain new data (e.g. the number of data disk drive to be written— in addition, the parity disk must be written when the stripe is posted). Since both the RMW and FW posting methods will write the same number of disk drives (datadrives+1), the selection between the two methods may be made based solely upon an estimate of the number of disk drives which must be read to compute the new parity information.

Element 602 computes RMWdrives to be an approximation of the number of disk drives to be read to perform an RMW posting method for the posting of the stripe. The value is computed as a worst case approximation in which each drive containing new data as well as the parity drive (i.e. datadrives+1) must be read to compute the new parity information. This is a worst case because it is possible that some of the data or parity blocks to be read are already resident in the first level (lower level) cache. However, to improve performance, the present invention does not search the lower level cache to make this determinations. Rather, the worst case possibility is used to select between the RMW and FW posting methods.

Element 604 is next operable to compute FW drives as an approximate (worst case) number of read operations required for the Full Write (or Stripe Write) posting method to post the stripe. The number of read operations required is, at worst, the number of drives per stripe (DPS) minus the datadrives and parity drive which need not be read (e.g. they will be written without requiring a preceding read operation). Elements 606–612 are operable to adjust the FWdrives estimated value up by one or two if the first or last blocks reside in a disk drive which contains a portion of the dirty blocks. These partial disk drive must also be read. Specifically, element 606 determines whether the startoffset is a block which is not at the start of a disk drive. If so, FWdrives is incremented by element 608 to add an additional partial drive to be read. Similarly, elements 610 and 612 are operable to increment FWdrives again if the endoffset represents a disk with portions of its blocks in the dirty blocks of the stripe.

Element 614 (continued onto FIG. 7) then applies the heuristic test of the posting selection method of the present invention. Specifically, if element 614 determines that the RMWdrives (drives to be read using the RMW posting method) is less than FW drives (the number of drives to be read to perform the Full Write posting method), then the RMW method is selected and performed by element 618. Otherwise, the Full Write method may be preferred. Element 616 is then operable to determine if at least half of the dirty blocks to be posted to the disk array are believed to be present in the first level cache (according to the information in the second level cache stripe management structure). If such is not the case (e.g. fewer than half are believed to be present in the first level cache), the RMW posting method is selected in preference to the Full Write method and processing continues with element 618. If more than half of the dirty block to be posted are believed to be in the first level cache as determined by operation of element 616, then the Full Write posting method is selected in preference to the RMW posting method and processing continues with element 620.

Elements 618 and 620 are representative of the processing required for each of the two posting methods. Specifically, element 618 represents all processing to post the requested dirty blocks (starting with firstblock for nblocks) using the RMW posting method well known to those of ordinary skill in the art. As noted above, the RMW method reads all disks containing the dirty blocks to be posted, including the associated parity drive, computes new parity information, and writes the new data and new parity back to the respective disk drives. Element 620 represents all processing required to post the requested dirty blocks using the Full Write method, namely, reading all other blocks in the stripe not believed to be dirty in the first level cache, computing new parity information, and writing the dirty blocks (new data) and new parity information back to their respective disk drives. In both cases, processing continues with element 622.

Element 622 resets the count of dirty blocks in the stripe management structure associated with the stripe for which all dirty blocks are now posted. Since the blocks are now properly stored on the disk drives, there are presently no dirty blocks in the first level cache which correspond to the stripe just posted. Processing is then completed for this invocation of the posting selection method. Other processing within the RAID controller will then invoke the posting selection method at appropriate times for the posting of other dirty stripes, or at a later time as additional dirty blocks are created.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a RAID storage subsystem including a plurality of disk drives organized into partitions, a RAID controller comprising:

a first level cache memory for storing buffers representing modified blocks stored on said plurality of disk drives;

a second level cache memory for storing control information which associates buffers in said first level cache memory with corresponding ones of said partitions; and processing means connected to said first level cache memory, and connected to said second level cache memory, and connected to said disk drives for posting said buffers from said first level cache memory to said disk drives in accordance with the control information stored in said second level cache memory.

2. The RAID controller of claim 1 wherein said processing means includes:

first posting means for posting said buffers from said first level cache memory to said disk drives, said first posting means including means for reading related blocks from said disk drives required for posting of said buffers from said first level cache memory;

second posting means for posting said buffers from said first level cache memory to said disk drives, said second posting means including means for reading related blocks from said disk drives required for posting of said buffers from said first level cache memory; and selection means for selecting between said first posting means and said second posting means.

3. The RAID controller of claim 2 further comprising:

first approximation means for approximating the number of read operations from said disk drives required in operation of said first posting means;

second approximation means for approximating the number of read operations from said disk drives required in operation of said second posting means; and wherein said selection means is responsive to said first approximation means and to said second approximation means to select said first posting means when said first posting means requires fewer read operations than does said second posting means and to select said second posting means when said second posting means requires fewer read operations than said first posting means.

4. The RAID controller of claim 3, wherein said RAID controller is a RAID level 5 controller and wherein said partitions of said plurality of disk drives are stripes in accordance with RAID level 5, and wherein said second level cache memory further comprises a plurality of data structures each corresponding to one of said stripes, each of said data structures including:

means for identifying a range of buffers in said first level cache memory which are part of the corresponding stripe.

5. The RAID controller of claim 4 wherein each said structure includes:

means for identifying the contiguity of said range of buffers in said first level cache memory which are part of the corresponding stripe.

6. A method, operable in a RAID controller connected to a plurality of disk drives organized into partitions of the redundant array, for writing data received from an attached host computer system to said plurality of disk drives comprising the steps of:

storing data, representative of modified block stored in said disk drives, in a first level cache memory associated with said RAID controller;

storing control information in a second level cache memory associated with said RAID controller, said control information correlating said data stored in said first level cache memory with said partitions; and posting said buffers from said first level cache memory to said disk drives in accordance with the control information stored in said second level cache memory.

7. The method of claim 6 wherein the step of storing information in a second level cache memory includes the step of:

storing values in said second level cache memory indicating a range of data stored in said first level cache memory and corresponding to a correlated one of said partitions.

8. The method of claim 7 further including the step of:

storing information in said second level cache memory indicative of the contiguity of the range of data stored in said first level cache memory and corresponding to a correlated one of said partitions.

9. The method of claim 6 wherein said RAID controller is a RAID level 5 controller and wherein said partitions are stripes and wherein the step of storing information in a second level cache memory includes the step of:

storing values in said second level cache memory indicating a range of data stored in said first level cache memory and corresponding to a correlated one of said stripes.

10. The method of claim 9 further including the step of:

storing information in said second level cache memory indicative of the contiguity of the range of data stored in said first level cache memory and corresponding to a correlated one of said stripes.

11. The method of claim 6 wherein the posting step includes the step of:

selecting a preferred posting method between a first posting method and a second posting method.

12. The method of claim 11 wherein the posting step includes the steps of:

approximating a first number of read operations from said disk drives required in operation of said first posting method;

approximating a second number of read operations from said disk drives required in operation of said second posting method; and wherein said step of selecting is responsive to the approximation of said first number and said second number to select said first posting method when said first number is less than said second number and to select said second posting method when said second number is less than said first number.

13. The method of claim 6 wherein said posting step includes the steps of:

determining the number of disk read operations required to perform a Read-Modify-Write method to post said data in said first level cache memory to said disk drives;

determining the number of disk read operations required to perform a Full Write method to post said data in said first level cache memory to said disk drives;

selecting between a Read-Modify-Write method and a Full Write method according to the lowest number of read operations required; and performing the selected post method to post said data in said first level cache memory to said disk drives.

14. In a RAID level 5 storage subsystem including a plurality of disk drives organized into stripes, a RAID level 5 controller comprising:

a first level cache memory for storing buffers representing modified blocks stored on said plurality of disk drives;

a second level cache memory for storing control information which associates buffers in said first level cache memory with corresponding ones of said stripes; and processing means connected to said first level cache memory, and connected to said second level cache memory, and connected to said disk drives for posting said buffers from said first level cache memory to said disk drives in accordance with the control information stored in said second level cache memory.

15. The RAID level 5 controller of claim 14 wherein said processing means includes:

RMW posting means for posting said buffers from said first level cache memory to said disk drives according to a Read-Modify-Write method, said RMW posting means including means for reading related blocks from said disk drives required for posting of said buffers from said first level cache memory;

FW posting means for posting said buffers from said first level cache memory to said disk drives according to a Full-Write method, said FW posting means including means for reading related blocks from said disk drives required for posting of said buffers from said first level cache memory; and selection means for selecting between said RMW posting means and said FW posting means.

16. The RAID level 5 controller of claim 15 further comprising:

RMW approximation means for approximating the number of read operations from said disk drives required in operation of said RMW posting means;

FW approximation means for approximating the number of read operations from said disk drives required in operation of said FW posting means; and wherein said selection means is responsive to said RMW approximation means and to said FW approximation means to select said RMW posting means when said RMW posting means requires fewer read operations than does said FW posting means and to select said FW posting means when said FW posting means requires fewer read operations than said RMW posting means.

17. The RAID level 5 controller of claim 16, wherein said second level cache memory further comprises a plurality of data structures each corresponding to one of said stripes, each of said data structures including:

means for identifying a range of buffers in said first level cache memory which are part of the corresponding stripe.

18. The RAID level 5 controller of claim 17 wherein each said structure includes:

means for identifying the contiguity of said range of buffers in said first level cache memory which are part of the corresponding stripe.

19. A method, operable in a RAID level 5 controller connected to a plurality of disk drives organized into stripes, for writing data received from an attached host computer system to said plurality of disk drives comprising the steps of:

storing data, representative of modified blocks stored in said disk drives, in a first level cache memory associated with said RAID level 5 controller;

storing control information in a second level cache memory associated with said RAID level 5 controller, said control information correlating said data stored in said first level cache memory with said stripes; and posting said buffers from said first level cache memory to said disk drives in accordance with the control information stored in said second level cache memory.

20. The method of claim 19 wherein the step of storing information in a second level cache memory includes the step of:

storing values in said second level cache memory indicating a range of data stored in said first level cache memory and corresponding to a correlated one of said stripes.

21. The method of claim 20 further including the step of:

storing information is said second level cache memory indicative of the contiguity of the range of data stored in said first level cache memory and corresponding to a correlated one of said stripes.

22. The method of claim 19 wherein the posting step includes the step of:

selecting a preferred posting method between a Read-Modify-Write posting method and a Full Write posting method.

23. The method of claim 22 wherein the posting step includes the steps of:

approximating a first number of read operations from said disk drives required in operation of said Read-Modify-Write posting method;

approximating a second number of read operations from said disk drives required in operation of said Full Write posting method; and wherein said step of selecting is responsive to the approximation of said first number and said second number to select said Read-Modify-Write posting method when said first number is less than said second number and to select said Full Write posting method when said second number is less than said first number.

* * * * *